United States Patent
Szilagyi et al.

(10) Patent No.: US 7,738,139 B2
(45) Date of Patent: Jun. 15, 2010

(54) INKING ON PHOTOGRAPHS

(75) Inventors: Zoltan C. Szilagyi, Seattle, WA (US); Thomas P. Russo, Seattle, WA (US); Sally L. Liu, Seattle, WA (US); Peter I. Lee, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/343,017

(22) Filed: Jan. 30, 2006

(65) Prior Publication Data
US 2007/0177171 A1    Aug. 2, 2007

(51) Int. Cl.
   *G06F 15/00* (2006.01)
(52) U.S. Cl. .................. 358/1.9; 358/2.1; 358/527; 358/538; 382/173; 345/593; 715/275
(58) Field of Classification Search .................. 358/1.9, 358/1.13, 2.1, 3.28, 527, 538, 453; 345/593; 382/103, 175, 173; 715/275
See application file for complete search history.

(56) References Cited

U.S. PATENT DOCUMENTS

| | | | |
|---|---|---|---|
| 5,598,185 A * | 1/1997 | Holmgren | 345/593 |
| 5,767,860 A * | 6/1998 | Zimmer et al. | 345/441 |
| 6,978,042 B1 * | 12/2005 | Shin et al. | 382/164 |
| 7,043,053 B1 * | 5/2006 | Patton et al. | 382/101 |
| 7,130,461 B2 * | 10/2006 | Rosenholtz | 382/165 |
| 2003/0043189 A1 * | 3/2003 | Rieffel et al. | 345/753 |

OTHER PUBLICATIONS

Avi Naiman, Color Spaces and Color Contrast, 1985, Springer-Verlag: The Visual Computer, pp. 194-201.*

* cited by examiner

*Primary Examiner*—King Y Poon
*Assistant Examiner*—Jamares Washington
(74) *Attorney, Agent, or Firm*—Lee & Hayes, PLLC (57) ABSTRACT

Methods of selecting a color for an electronic ink are disclosed. A portion of a photograph may be analyzed to determine a representative color value, which may be an average color value for the portion. Depending on the photograph, more than one representative color value may be determined. A color or colors, that may include gradients in brightness or saturation levels, which will be visible on the representative color value or values, may then be determined. A color of the electronic ink is then set to the appropriate color or colors so that when a user inks on a photograph, the ink is visible.

14 Claims, 10 Drawing Sheets

INKING ON PHOTOGRAPHS

BACKGROUND

Digital photography has mostly replaced film photography as the method of choice in archiving events and occasions. One advantage of a digital picture is that because the picture is digital, the same image can be sent to a number of people and it can be easily edited on a computer. For example, a digital picture can be cropped, rotated and touched up relatively quickly.

One potential problem with digital photographs, however, is that it is often difficult to remember what event a particular picture represents. For example, if a set of related photographs are stored in a computer file folder, it can be difficult to remember which picture represents what if the set is the result of a number of pictures taken over time. Conventional pictures also have this problem but since they have to be developed to be viewed, one can write on the back of the photograph and thus keep track. While it is possible to print digital photographs and write on the back as well, in practice the low cost of taking digital pictures allows many more pictures to be taken than are needed to be printed. Thus, a large number of digital pictures are not printed out but instead saved on a computer readable medium for some time when they are needed. While this is highly cost effective, the number of digital pictures that one can take and store makes it difficult to remember the details of a particular photograph. Therefore, it would be helpful to be able to mark up the photographs while they are still digital versions.

In addition, as pictures are a digital medium, sometimes it would be useful to place captions or text in the photograph before sending the photograph via email. For example, photographs may be made more appropriate for a particular occasion if comments are placed on the photograph. Thus, there are a number of reasons for why someone might want to mark up a digital photograph.

One method of marking up images such as photographs is to use electronic ink. In a manner similar to how a user marks up a physical image, a user can use electronic ink to mark up a digital image. For example, a user could use a device configured to control a cursor so as to electronically ink (e.g. write) on the photograph. Thus, one possible advantage of using electronic ink is that it is relatively intuitive for the user.

Certain existing software will allow a user to mark up a digital photograph (e.g. ink on the surface of the photograph). However, current software does not provide the level of ease that is desirable. For example, a default color used for the ink may not be compatible with a particular photograph or a region of the photograph (e.g. may not be readable or aesthetically pleasing in that region). Manually selecting the correct ink color can be time consuming and may even be difficult for some photographs or images.

SUMMARY

Aspects of the invention are directed toward electronically inking on an image such as a digital photograph. A portion of the photograph may be analyzed to determine an average color value of the portion. Using an algorithm, a color that would be visible on the average color value can be determined. An ink color may automatically be set to the visible color so as to facilitate inking on the photograph. The ink color may vary in different regions of the photograph and/or for different users. The ink color may be a compound set of colors. The ink color may also include gradients of brightness, saturation and/or hue so as to improve the visibility of the ink across the portion of the photograph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
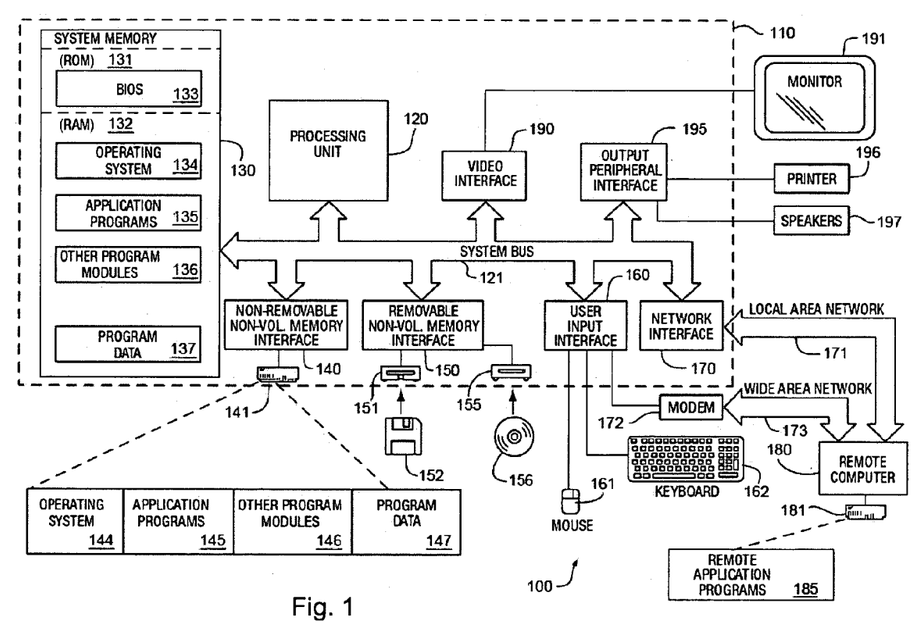
FIG. 1 illustrates a schematic diagram of a general-purpose digital computing environment in which one or more aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball, touch pad, where the pointing device may be used to control a cursor. Other input devices (not shown) may include a microphone, joystick, game pad, satellite dish, scanner, digitizer or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
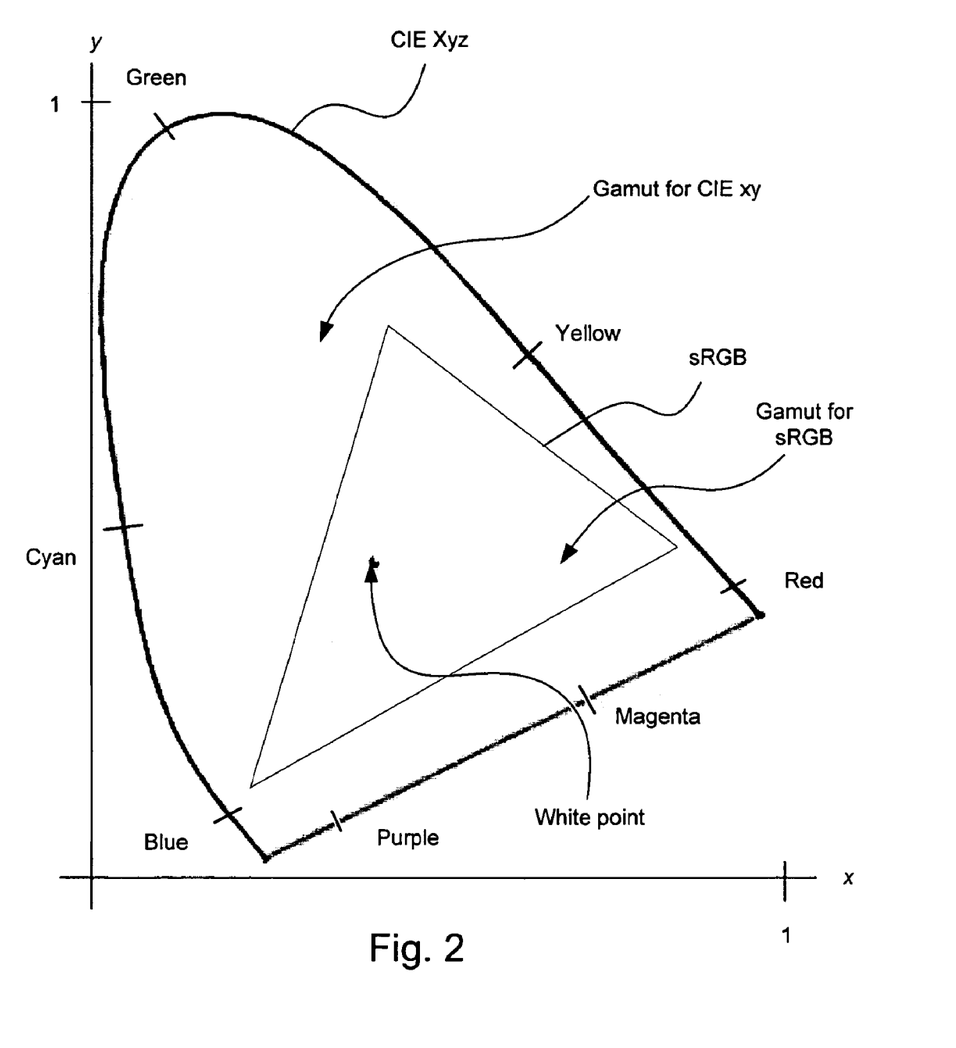
FIG. 2 illustrates an embodiment of a color space in accordance with one or more aspects of the present invention.

Turning to FIG. 2, an exemplary color space is depicted. Colors spaces are based on the idea that human eyes have three receptors that can observe red, green and blue. Studies conducted by the International Commission on Illumination were used to map the colors perceivable by the human eye to a color space known as CIE XYZ color space. This mapping, which is three dimensional, provides a positive value of X, Y, and Z for every possible color, where X, Y and Z roughly correspond to red, green and blue respectively. Three dimensional color plots are awkward to reproduce on a two dimensional drawing, however, therefore FIG. 2 illustrates a simplified plot of a CIE xy chromaticity diagram. As is known, the CIE xy chromaticity diagram represents the maximum chromatic range of visible colors and is generated with the equation:

$$x = \frac{X}{X+Y+Z}$$
$$y = \frac{Y}{X+Y+Z}$$

As can be appreciated, all color values have values ranging between 0 and 1 for x and y. Between any two points in the diagram, a line exists of all the colors that those two colors can produced when those two colors are combined. For example, a line between a red point and a green point would include yellow colors. In addition, three points can define a range of colors, known as a gamut, encompassed by a triangle made up of those three points. One thing to note, therefore, is that as the shape of the CIE xy chromaticity diagram (or color space) is horseshoe like, no three points within the color space can form a triangle that includes all visible colors. In other words, no three visible colors can produce the entire gamut of visible colors. It should be noted that white is an equal amount of each color, thus in the coordinates for white in the CIE xy space are $x=\frac{1}{3}$ and $y=\frac{1}{3}$. However, it should be noted that as the color space is actually three dimensional, the same level of color purity or saturation may look different depending on the amount of light or brightness. For example, a white will begin to appear grey and eventually become black as the amount of brightness is reduced. One advantage of the CIE XYZ color space is that it is an absolute color space, thus every color is defined. Furthermore, all the visible colors are included in the space. Unfortunately, the CIE XYZ color space (of which the CIE xy diagram is a projection) is complex to work with directly and therefore solutions providing portions of the CIE XYZ color space have developed.

For example, one common color space is a standard red green blue ("sRGB") color space. The sRGB color space is depicted as a triangle in the CIE xy diagram. As noted above, CIE XYZ is an absolute color space. While RGB color spaces are not required to be absolute and typically are device dependent, the sRGB color space is absolute because it is defined. Therefore, a color in the sRGB color space can be readily mapped to a color in the CIE XYZ color space. It should be noted that while the present disclosure will discuss certain aspects of the present invention with respect to the sRGB color space, the present invention is not so limited. In other words, other color spaces that can be mapped to the CIE XYZ color space can also be used in accordance with aspects of the present invention. In addition, aspects of the present invention can be practiced even if there is not a mapping to the CIE XYZ color space.

As can be appreciated, the corners of the sRGB color space consist of a red, green and blue color. However, as is apparent, the sRGB color space only covers about half of the visible spectrum of the CIE xy diagram. Therefore, if the sRGB color space is being used, any color outside the sRGB color space must be truncated so that it will fit within the sRGB color space. One method is to draw a line from the white point ($x=\frac{1}{3}$, $y=\frac{1}{3}$) to the desired color and pick a point on the boundary of the sRGB color space as being representative of the initial color. Alternatively, an intersection between the boundary of the sRGB color space boundary and a constant hue line (which may be a curved rather than a straight line) on which the initial color resided can be used so that the color outside the range of the sRGB color space receives a more accurate alternative color in the sRGB color space. Regardless, colors with saturation levels or hues outside the sRGB color space are truncated and stored as a sRGB color.

Figure 3:
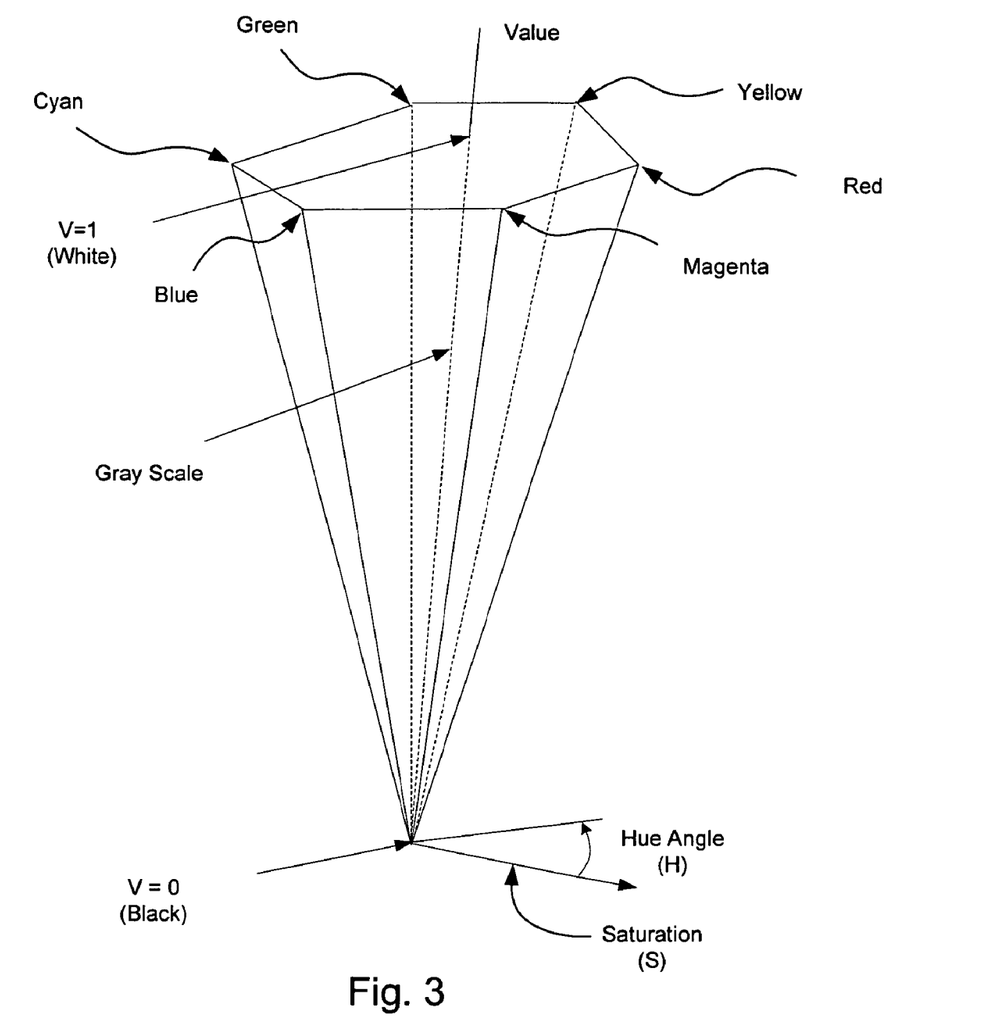
FIG. 3 illustrates an embodiment of a HSV color space in accordance with one or more aspects of the present invention.

As noted above, in reality the sRGB color space includes variations in the amount of light. Therefore, it is a three dimensional space. One nonlinear transformation of the sRGB color space that is commonly used is a hue, saturation and value ("HSV") color space and this space is depicted in FIG. 3.

As can be appreciated, technically the HSV color space is more cylindrical than cone shaped. However, the perceptual difference between colors becomes less as the amount of value or brightness is decreased. Therefore, the cone shaped HSV color space is an adequate approximation.

A color in the HSV color space is identified by the hue (H) or the angle, which may be represented as zero degrees being equivalent to red, 120 degrees being equivalent to blue and 240 degrees being equivalent to green. The amount of saturation (S) is the distance away from the center (normalized to be 1 at the maximum saturation level). The value (V) ranges from 0 to 1 and is the equivalent of brightness, where a zero value is black and a value of 1 (assuming no saturation) is white.

It should be noted that a HSV color space based on the sRGB color space can be converted into the CIE XYZ color space. In general, most colors in one color space can be mapped to a corresponding color in another color space. Certain colors in one color space may be outside the gamut of the color space being converted to, therefore known methods of truncating and mapping can be used. One advantage of using the HSV color space, however, is that the depiction of colors is more intuitive and therefore easier to work with.

Figure 4:
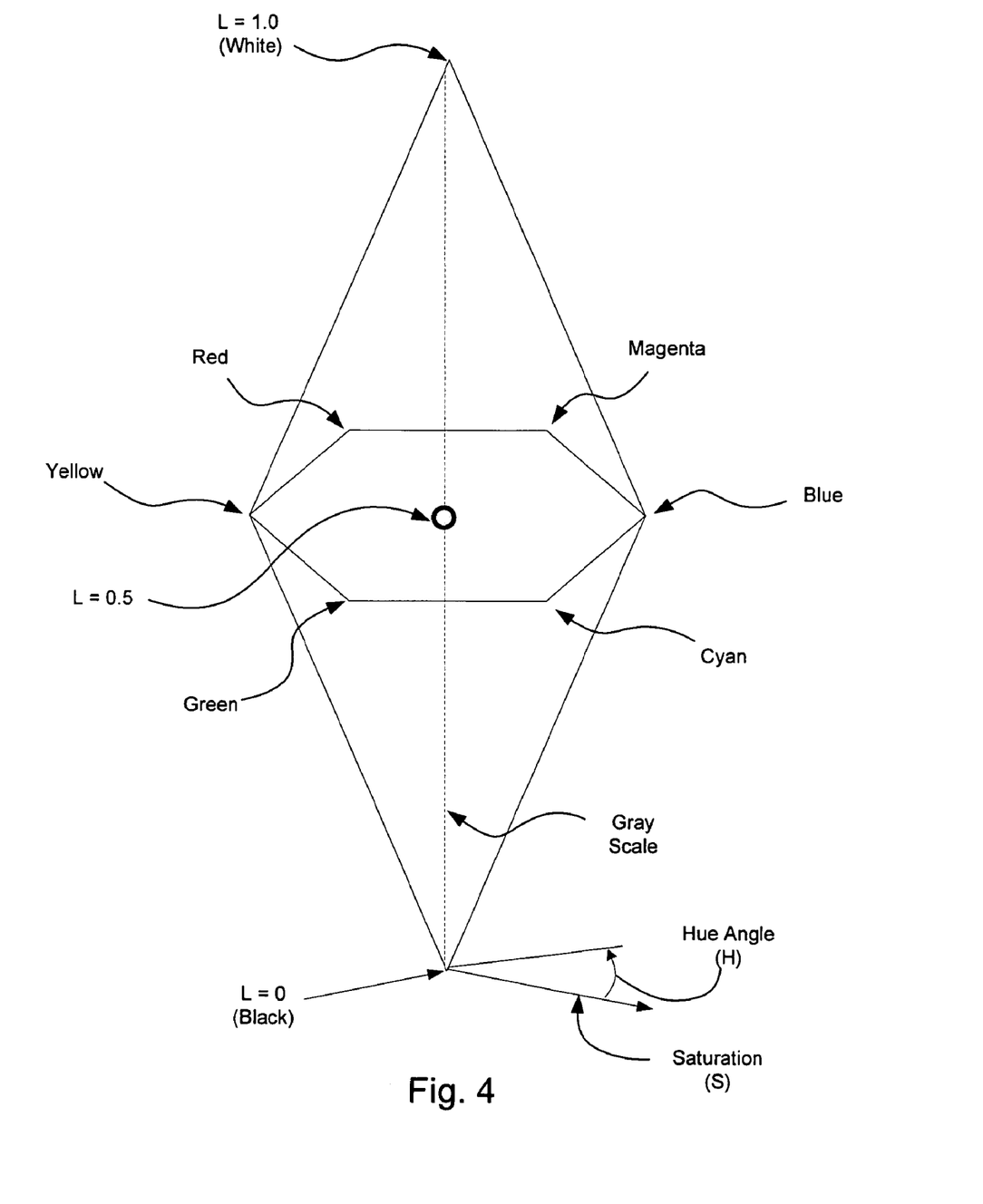
FIG. 4 illustrates an embodiment of a HSL color space in accordance with one or more aspects of the present invention.

It should be noted that a similar color space known as the hue, saturation, and level ("HSL") color space, an embodiment of which is provided in FIG. 4, can also be used. While similar to the HSV color space, the maximum saturation is where the level ("L") is equal to 0.5. While three dimensional, the HSL color space is also intuitive because black and white are at opposite ends of the level spectrum and colors are at a maximum half way between the black and white endpoints.

Turning now to the handling of images such as photographs, it can be appreciated that digital photographs have several issues that make it difficult to provide a uniform solution. First, they are captured with a particular type of sensor that has an inherent dynamic range. They are then saved via a format that may or may not preserve all the details regarding color. The photographs are then presented on a display that typically will have a more limited gamut than the sensors. As CRT displays, which until recently were the standard method of display, are basically limited to displaying colors in the sRGB gamut, to allow for workflow, the digital pictures may be saved in a sRGB format.

Assuming that the sRGB format is being used, with the understanding that other formats with a wider gamut may also be used, the photograph may have a number of colors on it. To record what the photograph represents or to simply place a desired text on the photograph, the user can ink on the photograph.

It should be noted that ink as used herein refers to electronic ink. Electronic ink may be structured as a sequence or set of strokes, where each stroke includes a sequence or set of points. A sequence of strokes and/or points may be ordered by the time captured and/or by where the strokes and/or points appear on a page. A set of strokes may include sequences of strokes and/or points, and/or unordered strokes and/or points. The points may be represented using a variety of known techniques including Cartesian coordinates (X, Y), polar coordinates (r, Θ), and other techniques as known in the art. A stroke may alternatively be represented as a point and a vector in the direction of the next point. A stroke is intended to encompass any representation of points or segments relating to ink, irrespective of the underlying representation of points and/or what connects the points. Ink collection typically begins at a digitizer, which may be a stand alone unit or incorporated into another device such as a display. A user may place a stylus on the digitizer (or use some other input means) and begin to write or draw. At that point, new ink packets (i.e., packets of ink-related data) may be generated. Packets may include not only position information but also stylus pressure and/or angle information. To store ink, an ink object may be created that represents the original strokes of ink drawn by the stylus. The ink object is essentially a container of ink data that may be stored as metadata so as to avoid modifying the original picture data. The use of metadata to store details regarding a data object is known and therefore will not be discussed herein.

It would be beneficial, however, to allow the user to mark up the photo without the need to select an ink color. In addition, it may be beneficial to provide different ink colors for different users. Therefore, in an embodiment, an application can analyze the image and provide the ink color for the one or more users. In an embodiment, the initial analysis may determine two or more colors (or combinations of colors as is discussed below) that would be visible. For example, in an embodiment with a circular cylindrical color space, one or more predetermined rotational angles, such as 30 degrees, could be both added and subtracted from the average color space so as to generate two or more different ink colors. Numerous other methods would also be possible, the results depending on how the colors were determined.

Figure 5:
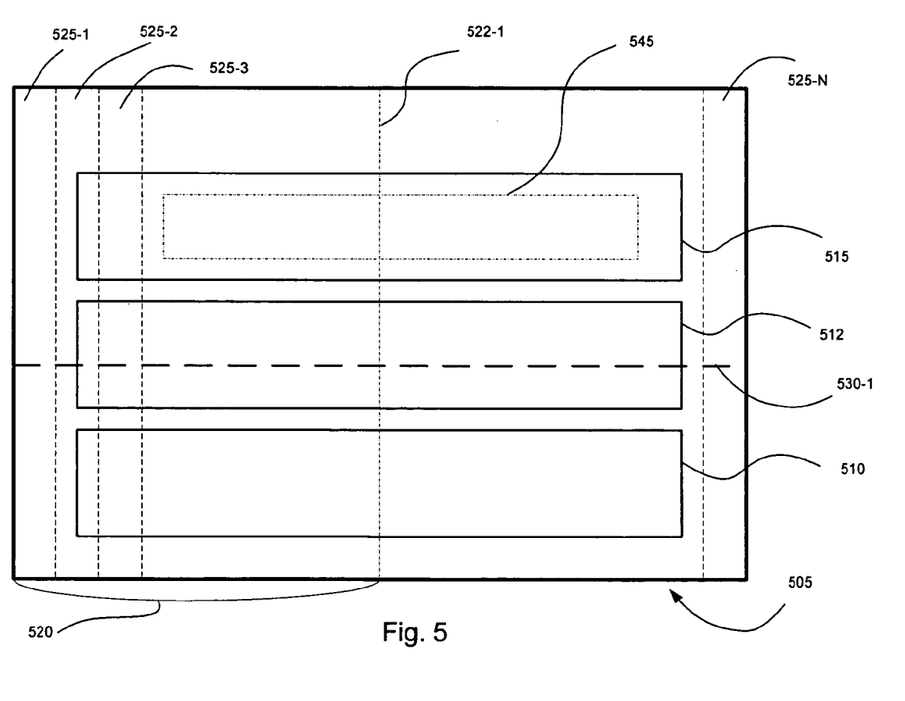
FIG. 5 illustrates an embodiment of a photograph in accordance with one or more aspects of the present invention.

Looking at FIG. 5, an embodiment of a digital photograph 505 is depicted. The photograph 505 includes a first color 510, a second color 512 and a third color 515. For simplicity's sake, the remainder of the photo can be considered as lacking any color but is instead some shade of gray.

In order to determine what ink color should be used, a hue value for a portion of the photograph may be determined. In an embodiment, this may be determined by averaging the hue values for each pixel so that the average of all the pixels provides an average for the photograph 505. In an embodiment, this may be done using the hue angle in the HSV color space. In an alternative, another color space may be used. In another alternative embodiment, the color space that the photograph is stored in may be mapped to the HSV color space. The advantage of using the HSV (or HSL, which is similar) is that the average hue will be an angle. In an embodiment, the average of the different colors may be weighted with the saturation level, therefore, a highly saturated first color will have a greater effect on the average hue that a second, slightly saturated color.

It should be noted that less then all the pixels may be reviewed to determine the representative color of the portion of the photograph. In an embodiment, a sample of N pixels may be used. As can be appreciated, the number of N pixels can be statistically representative while still being much less then the total number of pixels. The pixels may be selected randomly and the number of pixel N may vary depending on the processing power available and the accuracy desired.

If colors 510, 512 and 515 are similar, then the average hue will be close to colors 510, 512 and 515. However, if the colors 510, 512 and 515 are different (for example red, blue and green) then additional steps may be useful. Typically, however, an average hue can be determined that is meaningful representation of the color of the photograph.

If, however, the three colors 510, 512, and 515 are red, blue and green, then the average is not particular helpful. In addition, while some values will represent a percentage of the portion quite well, they may not represent other portions as well. Therefore, it can be helpful to break up the picture into regions. These regions may be based on dimensions (such as one half or a quarter of a photograph) or may be based on colors distribution patterns in the picture so that different regions have similar hues.

Looking at FIG. 5, the photograph 505 can be split into regions. For example, the line 522-1 can be used to split the photograph into two regions, one of which is region 520. If both regions have a substantial number of pixels with different hue values, then the regions can be made smaller as such as regions 525-1 through 525-N. In addition, two regions can be created by the line 530-1. Thus, as can be appreciated, the number of regions can increase as needed. Furthermore, by modifying the location of the line 530-1, regions of different and/or unequal size can be created.

One method of determining whether additional or different regions are needed is to measure the hue value of each pixel in the region. If a standard deviation in the hue value for the pixels is above a predetermined level, then the number of regions may be increased. In an embodiment, before trying to increase the number of regions, a second line perpendicular to the first line may be used to create two different regions. Other methods of defining regions may also be used. If the initial 2 regions, which depend on the method of separating the photograph, do not provide uniform colors within the respective region, then additional regions may be added. In an embodiment, the number of regions can be increased until some upper limit.

Once the average color values for the regions of the portion of the photograph 505 are determined, these average color values can be used to determine a second color that would be visible on the average colors. In an embodiment, the second color may be determined by selecting a hue that is 30 degrees different than the average color of the photograph using the HSV color space. As can be appreciated, this process could be repeated for each region and the ink color could change from region to region.

In an embodiment, the ink color may be set to a combination of average colors. For example, if the average hue of a region 525-1 is 120 degrees and the average hue of region 525-2 is 140 degrees, then that ink color may include a hue at 150 degrees and a hue at 170 degrees. In an embodiment, the ink color could include a gradient that gradually changed from the hue at 150 degrees to the hue at 170 degrees. Other methods of graphical variation between two colors, such as using a third color or fading to black or white in the middle of the ink are possible. As can be appreciated, this combination ink color would be visible in both regions because at least a portion of the ink will be distinct from each region. Furthermore, in an embodiment the combination may be a first color on an outer edge of the ink and a second color on an inner portion of the ink without a gradient between the two colors. In such an embodiment, the ink color for either the inner portion or the outer edge may be black or white or some variation based on the average hue of the region. For example, a black edge could surround a white interior.

It should be noted that portion of the photograph that needs to be analyzed may be less then that entire photograph. For example, portion 545, which represents the area that the user is planning to write or ink in, consists of a single color 515. Therefore, a single ink color that is visible on the color 515 could be used as the ink color.

As can be appreciated from the above discussion, the determination of the hue value can wait until the user decides to write on the photograph. For example, if the photograph were divided into two or more portions, when the user started to ink in one of the portions that portion would be considered selected and the determination of the hue value could take place. In an embodiment, the selecting may be accomplished by placing the cursor in the portion of a photograph (e.g. allowing the cursor to hover over a location) or otherwise indicating where the user plans to ink. As can be appreciated, if the determination of hue value is delayed until after a portion of the photograph is selected, the determination of the hue value can be limited to that portion. This may limit some of the analysis regarding variations in average hue from region to region because the portion selected may be less expansive than the entire photograph and the appropriate ink color may be easier to determine. Thus, the advantage of waiting until the selection is made is that there is a potential reduction in processing. The disadvantage is that all the processing must be done after the individual responds and this can slow down the determination of a suitable ink color.

Therefore, in an alternative embodiment, the determination of hue values can be started once a user selects an image but before the user indicates where on the image the user is planning on inking. As can be appreciated, other variations are possible. In an embodiment, the average hue and/or appropriate visible colors could be determined during an initial rendering and/or processing of the image. In an embodiment, the image could be divided into a number of regions such as a twenty by twenty grid of regions and the representative color of each region could be determined. When a user placed a cursor over a region, a representative color for a number of surrounding regions, such as a five by five grid of regions, could be determined. As can be appreciated, representative colors for groups of regions could also be predetermined. This data could be then saved as metadata with the image to reduce future processing and/or to facilitate inking on the image.

In another embodiment, the color of the ink could be determined after the stroke of ink was complete or after a set of strokes were completed. In an embodiment, handwriting algorithms could be used to recognize grammatical levels such as letter, word, sentence or paragraph structure and ink colors could assigned to the different grammatical levels as desired.

It should be noted that the processing used to determine the suitable ink color may be done in a background thread that may be scheduled separately when the computer is under a light load, for example when the picture is selected but before the user attempts to ink on the photograph. In addition, depending on the scheduling and available computing resources, any delay in determining the suitable ink color may be insignificant so as to allow real-time or near real-time determination of a suitable ink color.

Figure 6:
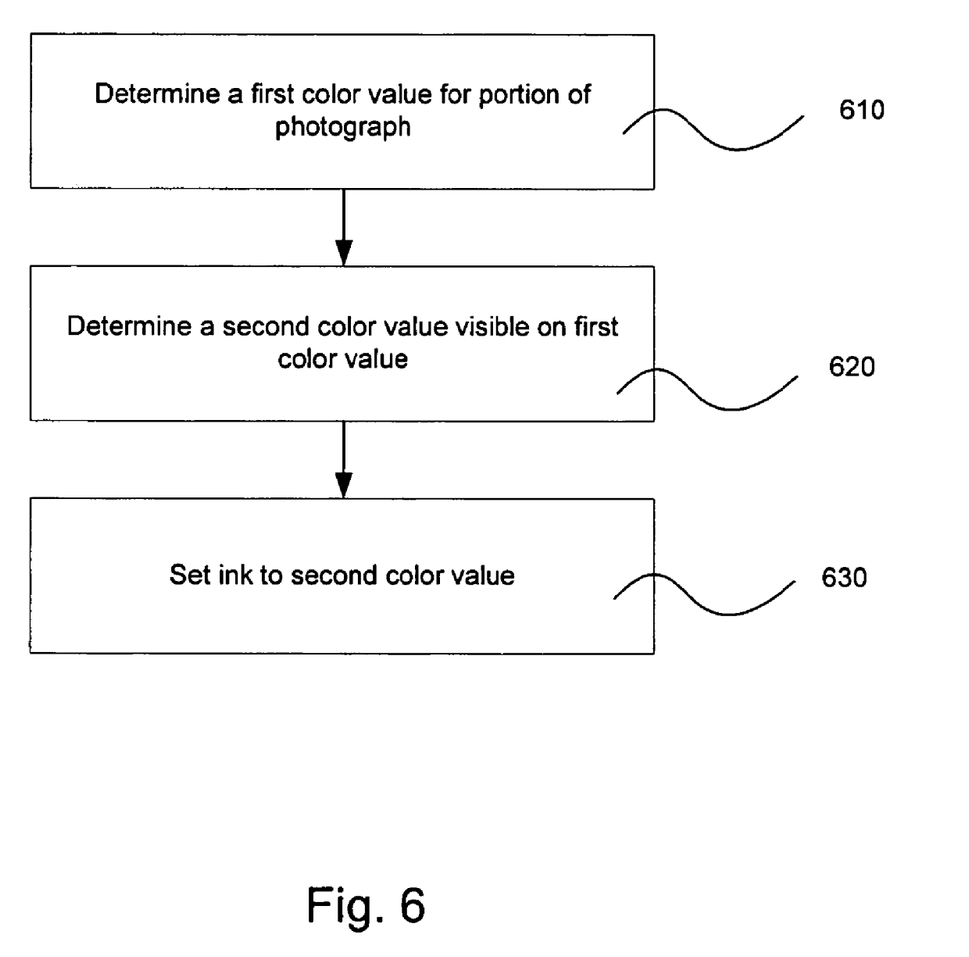
FIG. 6 illustrates an embodiment of a method of setting an ink color in accordance with one or more aspects of the present invention.

Turning to FIG. 6, an embodiment of selecting an ink color is depicted. First in step 610 a color value is determined for the portion of the photograph. In an embodiment, the portion may include the entire photograph. In an alternative embodiment, the portion may be less than the entire photograph and may be related to a selection made by a user (which as discussed, may be made in a number of ways including placing a cursor over the photograph).

The color value may be an average hue (or the equivalent, depending on the color space chosen). In an embodiment, the HSV color space may be used and the color value may be the angle of the hue representing the average hue. In an alternative embodiment, the color space being used may be mapped to the HSV color space (either directly or indirectly by mapping first to the CIE XYZ space, then to an absolute RGB color space such as sRGB and then to the HSV color space). In an embodiment, the color space the photograph is stored in may be used with the appropriate algorithm to determine the average hue value (or equivalent).

It should be noted that the color value determined in step 610 need not be an average but could instead be a median, mode or some other statistical summary of the color values provided in the portion. In addition, depending on the variation (e.g. the standard deviation in color), different methods may be used. In an embodiment, a greater standard deviation could vary the determination in step 610. Thus, the determined color value may or may not be the average color depending on the method chosen. The advantage of using an average is that it may be computationally less demanding.

Next in step 620, a second value of color is determined that will be visible on the first color value. In an embodiment where the HSV color space is being used, the second value of color may be a hue having an angle different than the angle of the average hue. In an embodiment, the determined hue may be about 30 degrees different than the average hue. While other angles may be used, 30 degrees provides a perceptible difference while still being aesthetically pleasing to the eye. The 30 degrees could be added or subtracted from the average hue angle and the decision to add or subtract may vary depending on the value of the average hue.

In step 630 the ink color is set to equal the second value of color and the user may proceed to marking up the photograph. As noted above, the color of the ink and the actual text (along with any other changes to the photograph) may be stored in metadata so as to avoid modifying the data of the original photograph.

It should be noted that in addition to hue values, the color value may also include a level of brightness or a saturation level. In an embodiment, the level of brightness of the first color value may be matched in the determination of the second color value. In an alternative embodiment, the level of brightness (the V value in the HSV color space) in the second color value may be varied from the first color value by some predetermined amount. Similar variations are also possible with the saturation level. In addition, it should be noted that ink color may varying in brightness or saturation level so that a stroke of ink does not provide a consistent brightness or saturation level. Thus, in an embodiment the ink color may include a gradient of brightness and/or a gradient of saturation (alone or in combination with a gradient in hue, as discussed below). One advantage of varying the brightness or saturation is that once a hue is determined to be visible, varying the brightness or saturation allows for a variation in the effective ink color without additional calculations of other hues. In addition, variations in brightness and/or saturation levels may make it easier to see the ink.

Figure 7:
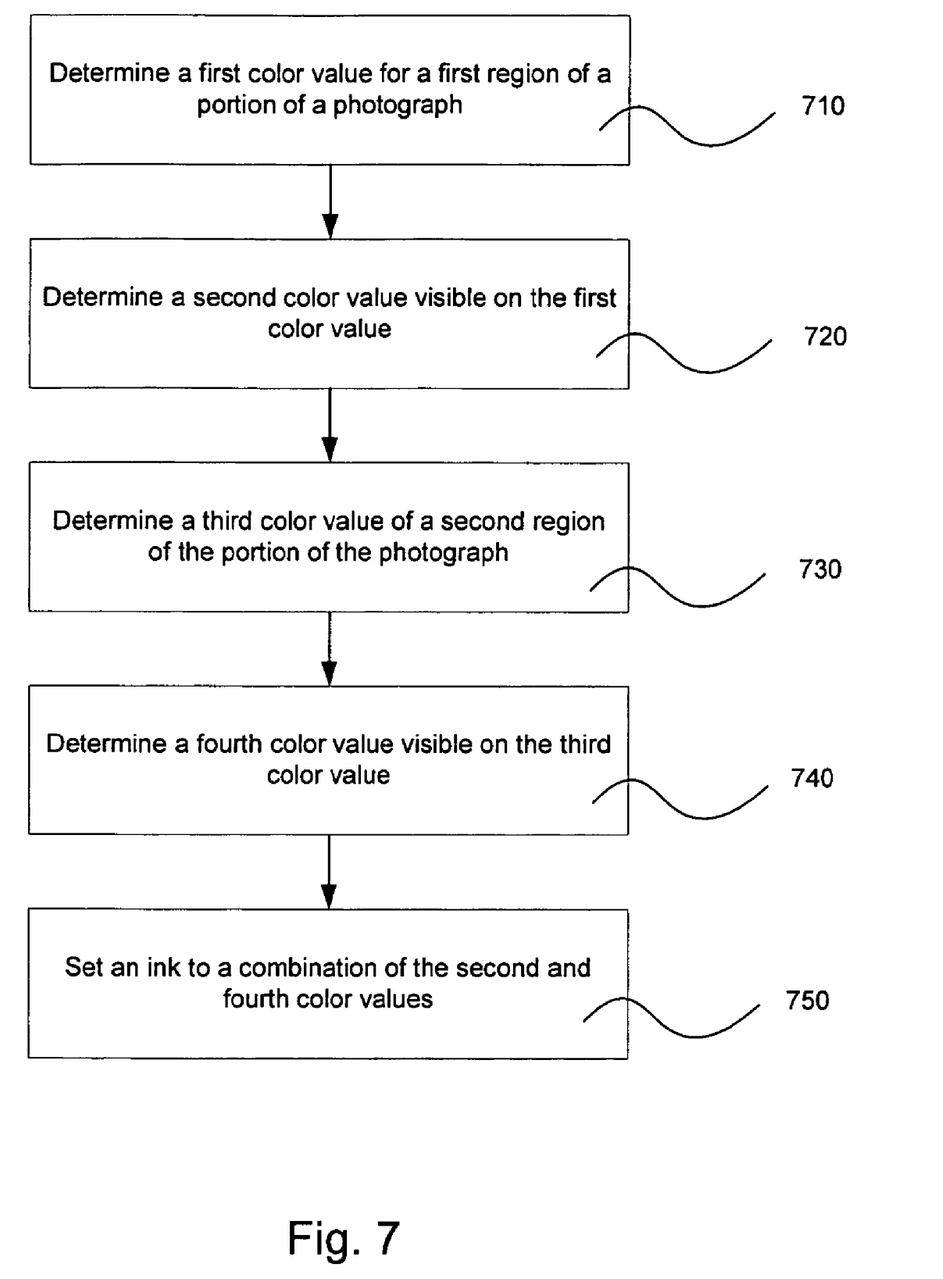
FIG. 7 illustrates an alternative embodiment of a method of setting an ink color in accordance with one or more aspects of the present invention.

Looking next at FIG. 7, an alternative method of providing an ink color is disclosed. First in step 710, a first color value for a first region is determined. In an embodiment, the region may be a simple one half of the total portion. In an alternative embodiment, the region may be statistically determined based on variation in hue color over the portion of the photograph. The color value may be determined as described with respect to FIG. 6. In step 720, a second color is determined that will be visible on the first color.

In step 730, a third color value is determined for a second region of the portion. It should be noted that while the first and second region may encompass the entire portion of the photograph, they may not be the same size. In an embodiment, the size of the regions may be determined based on the color distribution in the portion so as to provide two regions with an average color value in each region having a low standard deviation. In other words, the boundary separating the two regions may be adjusted so as to provide two regions with low deviations in color. It should be noted that the color distribution for any region may be determined by sampling a subset of the pixels in that region.

Figure 9:
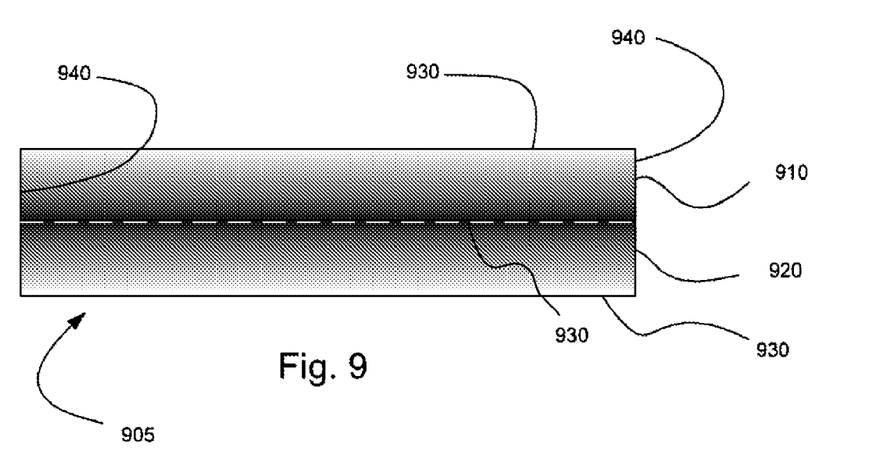
FIG. 9 illustrates an embodiment of an ink color in accordance with one or more aspects of the present invention.
Figure 10:
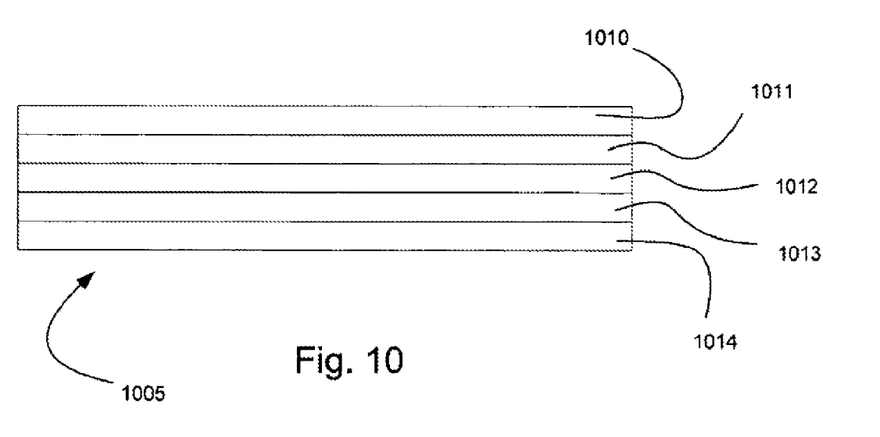
FIG. 10 illustrates an alternative embodiment of an ink color in accordance with one or more aspects of the present invention.

In step 740 a fourth color that will be visible on the third color is determined. In step 750, the ink color is set to be a combination of the second and fourth color. In an embodiment, the second and fourth colors can be combined to create a two band ink. FIG. 9 illustrates an embodiment of a two band ink 905. In an embodiment, a first band 910 may be the second color and a second band 920 may be the fourth color. Naturally, variations are possible. For example, the number of bands may be increased as depicted in FIG. 10. In an embodiment, color bands 1010 and 1014 could represent the second and fourth color, respectively. Color bands 1011 through 1013 could be colors representing an equal fraction of the distance between the color band 1010 and the color band 1014. In an embodiment using the HSV color space, the color band 1010 may be 145 degrees and the color band 1014 may be 165 degrees. The color bands 1011 could be 150 degrees, the color band 1012 could be 155 degrees and the color band 1013 could be 160 degrees. As can be appreciated, the number of color bands may vary as desired and the variation between color bands may also vary as is appropriate. In addition, the same color may be used in different bands.

In addition, brightness gradients may be applied to the bands. Referring back to FIG. 9, the color in color band 910 may include a level of brightness that varies from high to low value moving from one edge 930 to another edge 930. In an embodiment, variations in saturation level may also be used. For example, in an embodiment using the HSV color space, the saturation level may vary from a maximum at a first edge to a value approaching zero at a second edge. It should be noted that the brightness or saturation level may vary between edges 930 or between ends 940. Furthermore, one of the bands may be omitted and a single band with variations in either brightness or saturation level may also be used.

Figure 8:
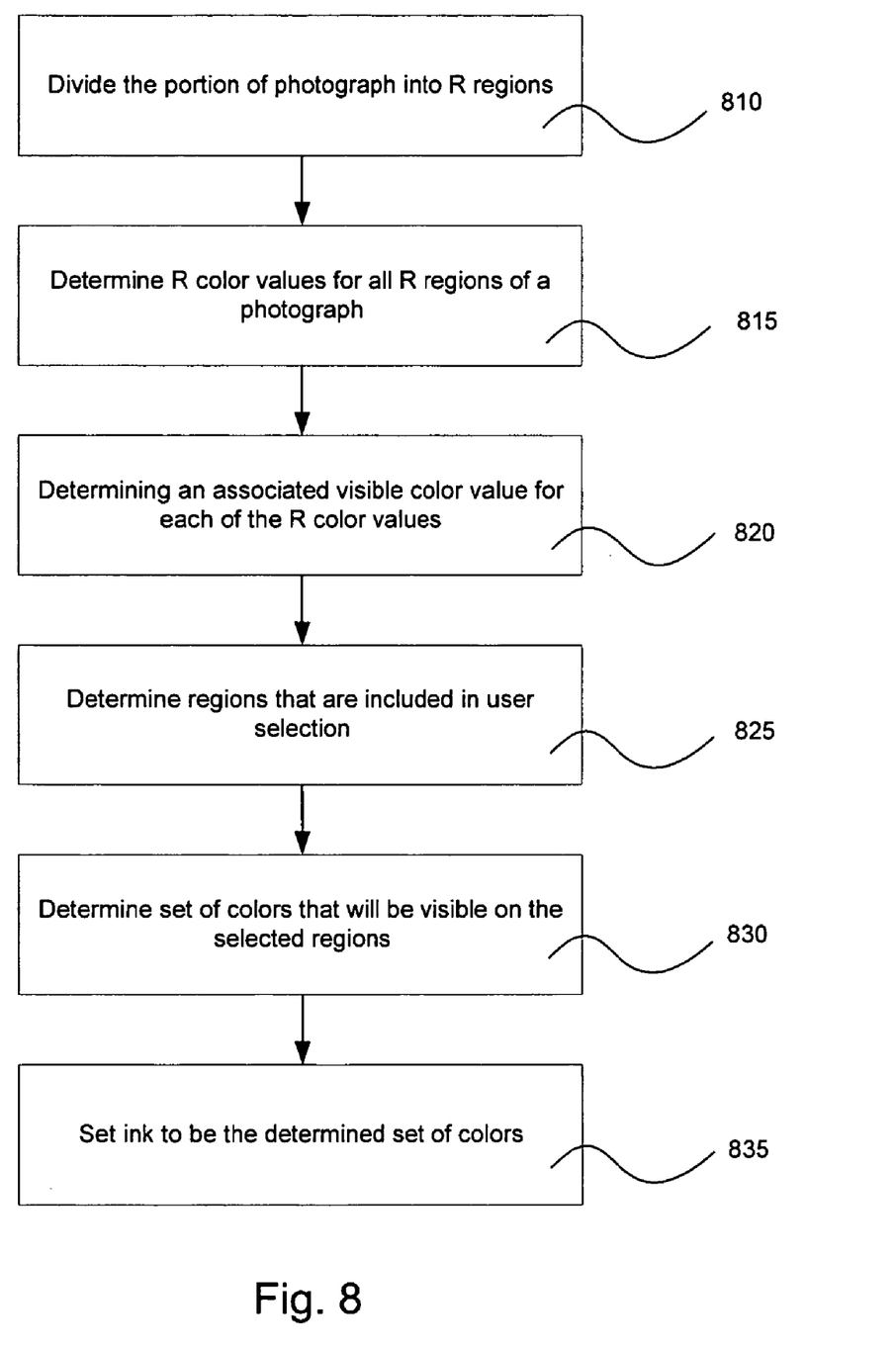
FIG. 8 illustrates another alternative embodiment of a method of setting an ink color in accordance with one or more aspects of the present invention.

Looking now at FIG. 8, an alternative method of setting the ink color is provided. In step 810, the portion is divided into R regions, where R is two or more. In an embodiment the number of regions can be based on the variation in color in the portion as discussed above. In an alternative embodiment, the number of regions can be predetermined.

In step 815 a color value is determined for each region. In an embodiment, the color value will be an angle representing an average hue of the region in the HSV color space. Next in step 820, a visible color for each region may be determined. In an embodiment, the visible color may be an angle 30 degrees offset from the angle of the average hue of the region using the HSV color space.

In step 825, after a user selects a portion of the photograph to mark up, the regions that are included in the selection are determined. In step 830 the colors that are visible in the selected regions are determined and in step 835 an ink color is provided, the ink color composed of the set of colors that are visible in the selected regions.

It should be noted that the ink may be relatively thin, thus it may be undesirable to use a larger number of colors for the ink. Therefore, it may be more useful to select one or two colors that are visible in a majority of the regions. In an embodiment, the colors may be mapped to a color space where the distance between colors is related with an ability to perceive the variations in color. One or more colors values could then be selected for the ink color such that the average color value of each region was different than at least one of the selected ink colors values.

Figure 11:
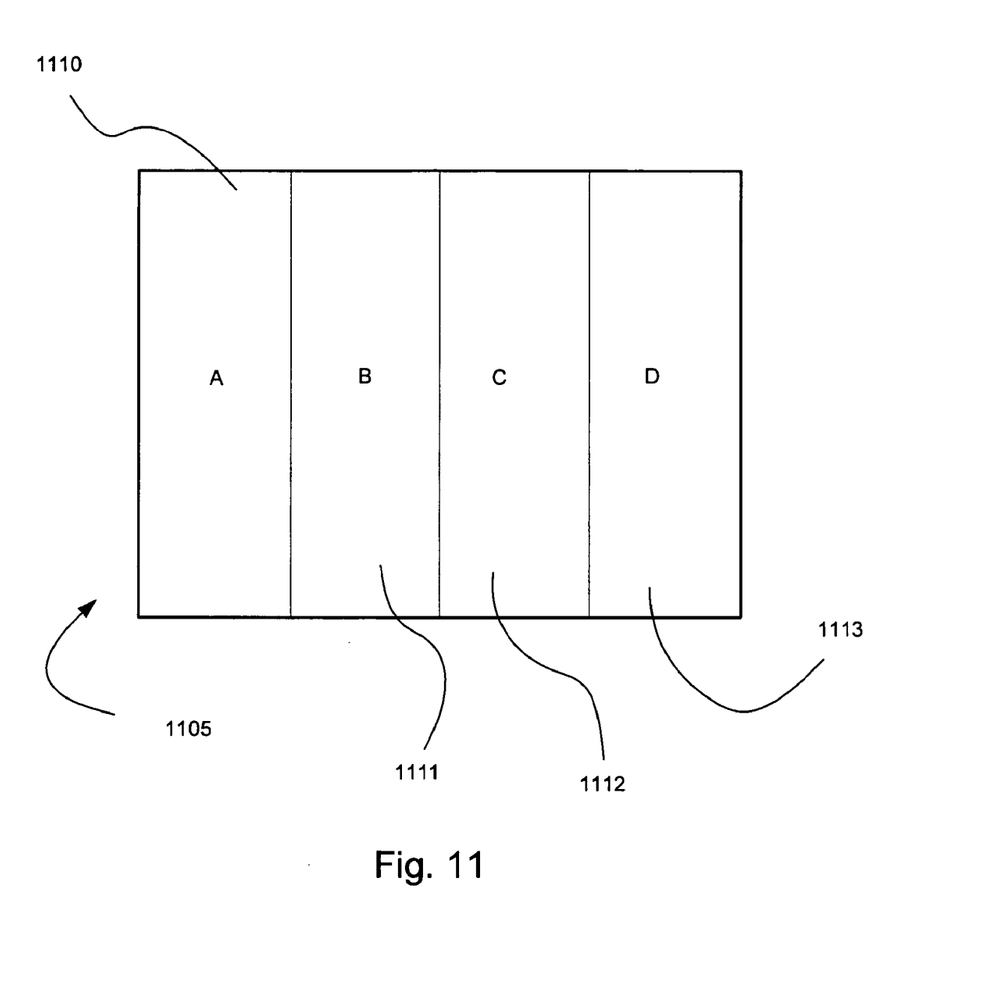
FIG. 11 illustrates an embodiment of regions of a photograph in accordance with one or more aspects of the present invention.

For example, looking at FIG. 11, a photograph 1105 includes regions 1110-1113, where each region has a color value A-D, respectively. In an embodiment, a first color may be determined that is visible on color values A and C and a second color value may be determined that is visible on color values B and D. Therefore, an ink including the first and second colors would be visible in all the regions of the photograph. In an embodiment, the first color may be determined by selecting a color that is at least 30 degrees different from both A and C. The second color may be determined in a similar manner.

As can be appreciated, the above methods may be combined and steps added or omitted as desired, depending on the processing power available and the range of color distribution provided in the photograph or whatever other image is being considered. As can be further appreciated, different color spaces will require different algorithms; however the variation is primarily in the formulas or computations used to determine a color value for a region or an entire portion of the image. Once the color value is determined, a predetermined offset may be used to determine the visible color. It should be noted that the predetermined offset may vary depending on the color value of the portion of the image. In addition, as discussed above, gradients may be used to vary the appearance of the color used in the ink.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A computer-implemented method of setting an ink stroke for marking up a first portion of an image, the computer-implemented method comprising:

under control of one or more computer devices configured with executable instructions, comparing a standard deviation of color values in the first portion to a predetermined threshold;

dividing the first portion into a first region and a second region when the standard deviation is above the predetermined threshold;

designating the ink stroke having a plurality of colors for application on the first portion when the standard deviation is above the predetermined threshold, comprising:

determining a first color value that is visible on the first region of the first portion based on colors displayed in the first region;

determining a second color value visible on the second region of the first portion based on the colors displayed in the second region, the second color value different than the first value; and setting the ink stroke for application on the first portion of the image to include a first ink band portion having the first color value and a second ink band portion having the second color value, wherein the first color value is visible in the first region and the second color value is visible in the second region; and designating the ink stroke having a single color for application on the first portion such that the ink stroke is visible on the first portion when the standard deviation is not above the predetermined threshold.

2. The computer implemented method of claim 1, wherein the first portion comprises the entire image and the image is a digital photograph.

3. The computer-implemented method of claim 1, wherein the first portion comprises a fraction of the image, the fraction equaling to 1/N, wherein N is a positive value greater than 1.

4. The computer-implemented method of claim 1, wherein determining the first color value comprises:

determining an average color value for the first portion by sampling a subset of pixels in the first portion; and determining the first color value, the first color being visible on the average color value.

5. The computer-implemented method of claim 1, wherein determining the first color value comprises:

calculating a first hue value in a HSV color space, the first hue value being about 30 degrees different than an average hue value of the first portion.

6. The computer-implemented method of claim 1, wherein determining the first color value comprises:

calculating a first portion average color value for the first portion in a color space used to store the photograph; and determining the first color value in the color space, the first color value selected so as to be visible with respect to the first portion average color value.

7. The computer-implemented method of claim 1, wherein the ink stroke includes a color gradient that changes from the first color value to the second color value.

8. The computer-implemented method of claim 1, wherein setting the ink stroke further comprises applying a brightness gradient or a saturation gradient to the first and second ink band portions of the ink stoke, the brightness gradient and the saturation gradient being applied using the Hue, Saturation, Value (HSV) color space or the Hue, Saturation, Lightness (HSL) color space.

9. The computer-implemented method of claim 8, wherein dividing the first portion comprises:

determining a color distribution on the portion; and selecting a boundary between the first and second regions so as to reduce a deviation of color within each region.

10. A computer-implemented method of providing an ink for use in marking up a digital photograph, comprising:

under control of one or more computer devices configured with executable instructions, comparing a standard deviation of color values in a portion of the digital photograph to a predetermined threshold, dividing the portion into a first region and a second region based on color distribution when the standard deviation is above the predetermined threshold;

designating a combination ink color for an ink stroke for application on the portion when the standard deviation is above the predetermined threshold, wherein designating the combination ink color comprises:

determining a first hue visible on the first region and determining a second hue visible on the second region, the determining using the hue, saturation and value color space, and placing the first hue in a first ink band of the combination ink color and a second hue in a second ink band of the combination ink color.

11. The computer-implemented method of claim 10, wherein determining the first hue and the second hue comprises;

determining a representative hue for the first and second regions.

12. The computer-implemented method of claim 10, wherein designating the combination ink color further comprises;

providing a first gradient of brightness for the first hue between first edges of the first band and a second gradient of brightness for the second hue between second edges of the second band, the first and second brightness gradients being provided using the Hue, Saturation, Value (HSV) color space or the Hue, Saturation, Lightness (HSL) color space.

13. The computer-implemented method of claim 10, wherein designating the combination ink color further comprises;

varying the levels of saturation of the first hue and the second hue from edge to edge of the respective bands, wherein the junction of the first and second band have a saturation approaching zero the levels of saturation being varied using the Hue, Saturation, Value (HSV) color space or the Hue, Saturation, Lightness (HSL) color space.

14. The computer-implemented method of claim 10, further comprising designating a single ink color that is visible on the portion for the ink stroke when the standard deviation is not above the predetermined threshold.

* * * * *